(12) United States Patent
Zhang et al.

(10) Patent No.: US 10,651,717 B2
(45) Date of Patent: May 12, 2020

(54) SIX-DEGREE-OF-FREEDOM LINEAR MOTOR

(71) Applicant: SHANGHAI MICRO ELECTRONICS EQUIPMENT (GROUP) CO., LTD., Shanghai (CN)

(72) Inventors: Lin Zhang, Shanghai (CN); Subing Duan, Shanghai (CN); Hai Xia, Shanghai (CN); Liwei Wu, Shanghai (CN)

(73) Assignee: SHANGHAI MICRO ELECTRONICS EQUIPMENT (GROUP) CO., LTD., Shanghai (CN)

(*) Notice: Subject to any disclaimer, the term of this patent is extended or adjusted under 35 U.S.C. 154(b) by 310 days.

(21) Appl. No.: 15/540,925

(22) PCT Filed: Dec. 29, 2015

(86) PCT No.: PCT/CN2015/099380
§ 371 (c)(1),
(2) Date: Jun. 29, 2017

(87) PCT Pub. No.: WO2016/107539
PCT Pub. Date: Jul. 7, 2016

(65) Prior Publication Data
US 2017/0373580 A1 Dec. 28, 2017

(30) Foreign Application Priority Data
Dec. 30, 2014 (CN) .......................... 2014 1 0857405

(51) Int. Cl.
*H02K 41/03* (2006.01)
(52) U.S. Cl.
CPC ....... *H02K 41/031* (2013.01); *H02K 2201/18* (2013.01); *H02K 2213/03* (2013.01)

(58) Field of Classification Search
CPC ............ H02K 41/031; H02K 2201/18; H02K 2213/03; H02K 41/02; H02K 41/03; H02K 41/00
(Continued)

(56) References Cited

U.S. PATENT DOCUMENTS 5,701,039 A * 12/1997 Parison .................. H02K 41/03
310/12.25
6,495,934 B1 * 12/2002 Hayashi .............. G03F 7/70758
29/596
(Continued)

FOREIGN PATENT DOCUMENTS

CN 103580444 A 2/2014
JP S5778359 A 5/1982
(Continued)

*Primary Examiner* — Forrest M Phillips
(74) *Attorney, Agent, or Firm* — Muncy, Geissler, Olds & Lowe, P.C.

(57) ABSTRACT

A six-degree-of-freedom linear motor is disclosed, including a magnet array and a coil group disposed above the magnet array, the magnet array includes a first Halbach magnet array and a second Halbach magnet array, the first Halbach magnet array has a parallelogrammic cross section in a plane defined by X- and Y-axes, the first Halbach magnet array has a first side parallel to the Y-axis and a second side forming an angle of θ with the Y-axis, the second Halbach magnet array is in mirror symmetry with the first Halbach magnet array with respect to the Y-axis, and the coil group includes a first, second, third and fourth coil group, each having an axis inclined at an angle of θ with respect to the Y-axis, the first and second coil groups are in mirror symmetry with the third and fourth coil groups with respect to the Y-axis, respectively.

8 Claims, 5 Drawing Sheets

(58) Field of Classification Search
USPC ......... 310/12.02, 12.06, 12.01, 12.03, 12.04,
310/12.07, 12.08, 12.09, 12.1, 12.11,
310/12.12, 12.13, 12.14, 12.15, 12.16,
310/12.17, 12.18, 12.19, 12.2, 12.21,
310/12.22, 12.23, 12.24, 12.25, 12.26
See application file for complete search history.

(56) References Cited

U.S. PATENT DOCUMENTS

| | | | |
|---|---|---|---|
| 6,531,793 B1* | 3/2003 | Frissen | G03F 7/70758 310/12.06 |
| 7,737,419 B2* | 6/2010 | Asano | G03F 7/70758 250/442.11 |
| 7,808,133 B1 | 10/2010 | Widdowson et al. | |
| 8,115,348 B2 | 2/2012 | Hsu et al. | |
| 8,541,912 B2* | 9/2013 | Cardon | H02K 41/031 310/12.05 |
| 9,755,493 B2* | 9/2017 | Wu | H02K 41/031 |
| 2003/0117026 A1* | 6/2003 | Korenaga | G03F 7/70758 310/12.26 |
| 2008/0290741 A1* | 11/2008 | Cardon | H02K 41/031 310/12.06 |
| 2010/0187917 A1* | 7/2010 | Zhu | G03F 7/70725 310/12.06 |
| 2010/0238425 A1* | 9/2010 | Binnard | G03B 27/58 355/72 |

FOREIGN PATENT DOCUMENTS

| | | |
|---|---|---|
| JP | S62159176 U | 10/1987 |
| JP | 2007006545 A | 1/2007 |
| KR | 20140084238 A | 7/2014 |

* cited by examiner

SIX-DEGREE-OF-FREEDOM LINEAR MOTOR

TECHNICAL FIELD

The present invention relates to the field of photolithography and, in particular, to a linear motor with six degrees of freedom (DoFs).

BACKGROUND

With the advances in photolithography and the rapid development of the semiconductor industry, the following four basic metrics have been developed for measuring the performance of photolithography equipment: critical dimension (CD) uniformity, focus, overlay and throughput. In order to enhance the CD uniformity, increases in horizontal positioning accuracy of the wafer or mask stage are required. In order to enhance the focus accuracy, increases in vertical positioning accuracy of the wafer or mask stage are required. In order to obtain higher overlay accuracy, a photolithography tool has to improve the internal model of its wafer or mask stage for better dynamic positioning performance. In addition, in order to meet the necessary requirement for an increasing throughput of photolithography equipment, the wafer or mask stage is further required to be capable of fast movement, quick start-up and shutdown. The high-speed, high-acceleration and high-positioning-performance requirements on photolithography equipment conflict with one another, because a higher scanning speed requires a more powerful motor capable of long path movement at a higher speed with multiple DoFs for lithographic exposure and alignment. Linear motors are transmission devices that can directly convert electric power into linear mechanical movement without the aid of any intermediate conversion mechanism. They are advantageous over rotary motors in terms of structural simplicity, positioning accuracy, transmission efficiency, etc. and have therefore been widely used in high-precision positioning platforms for photolithography equipment.

As shown in FIGS. 1 and 2, a conventional linear motor generally includes a Halbach magnet array 101 and a group of three-phase coils 102a, 102b, 102c. Upon the three-phase coils 102a, 102b, 102c energized with respective three-phase electrical currents, the Halbach magnet array 101 works with the three-phase coils 102a, 102b, 102c to produce actuating forces. The mechanism is that, assuming the currents introduced in the three-phase coils 102a, 102b, 102c are respectively ia, ib, ic, the linear motor is displaced by a distance of y in the Y-direction, a pole pitch of the permanent magnets is $\tau$, and every two adjacent coils are spaced apart by $4\tau/3$, flux densities Bya, Byb, Byc of a magnetic field created by the three-phase coils 102a, 102b, 102c in the Y-direction and flux densities thereof Bza, Bzb, Bzc in the Z-direction are given as:

$$\begin{cases} Bya = \hat{B}y \cdot \cos\left(\frac{\pi y}{\tau}\right) \\ Byb = \hat{B}y \cdot \cos\left(\frac{\pi y}{\tau} + \frac{4\pi}{3}\right) \\ Byc = \hat{B}y \cdot \cos\left(\frac{\pi y}{\tau} + \frac{8\pi}{3}\right) \end{cases} \quad (1)$$

$$\begin{cases} Bza = -\hat{B}z \cdot \sin\left(\frac{\pi y}{\tau}\right) \\ Bzb = -\hat{B}z \cdot \sin\left(\frac{\pi y}{\tau} + \frac{4\pi}{3}\right) \\ Bzc = -\hat{B}z \cdot \sin\left(\frac{\pi y}{\tau} + \frac{8\pi}{3}\right) \end{cases} \quad (2)$$

where, $\hat{B}y$ represents Y-directional flux density amplitude of the Halbach magnet array 101, and $\hat{B}z$ denotes Z-directional flux density amplitude of the Halbach magnet array 101.

According to a vector control technique for three-phase motors, control is accomplished by D-Q decomposition, wherein vertical and horizontal (i.e., in the X-Y plane) forces are controlled by d- and q-axis currents, and the currents ia, ib, is for the three-phase coils 102a, 102b, 102c can be expressed as a function of the d- and q-axis currents id and iq:

$$\begin{cases} ia = iq \cdot \cos\left(\frac{\pi y}{\tau}\right) - id \cdot \sin\left(\frac{\pi y}{\tau}\right) \\ ib = iq \cdot \cos\left(\frac{\pi y}{\tau} + \frac{4\pi}{3}\right) - id \cdot \sin\left(\frac{\pi y}{\tau} + \frac{4\pi}{3}\right) \\ ic = iq \cdot \cos\left(\frac{\pi y}{\tau} + \frac{8\pi}{3}\right) - id \cdot \sin\left(\frac{\pi y}{\tau} + \frac{8\pi}{3}\right) \end{cases} \quad (3)$$

Therefore, the Y- and Z-forces Fy, Fz generated by the linear motor are:

$$\begin{bmatrix} Fy \\ Fz \end{bmatrix} = \begin{bmatrix} Bya & Byb & Byc \\ Bza & Bzb & Bzc \end{bmatrix} \times \begin{bmatrix} ia \\ ib \\ ic \end{bmatrix} \quad (4)$$

The Y-directional horizontal force Fy and the Z-directional vertical force Fz make the linear motor able to move in the Y- and Z-directions, respectively. However, during the exposure and alignment, the photolithography equipment needs to move with six DoFs, i.e., the freedom of translational movement in the X-, Y- and Z-directions and slight rotational movement about the X-, Y- and Z-directions. Therefore, the traditional linear motor cannot meet the requirements of high-precision positioning.

In order to solve this problem, there has been also proposed in the prior art a linear motor incorporating four instances of the conventional Halbach linear motor so that they can cooperate with one another to support six-DoF movement needed by a photolithography platform. However, subject to limitations arising from the layout of magnet arrays, the linear motor has a limited movement path length in the horizontal direction.

SUMMARY OF THE INVENTION

The present invention seeks to overcome the drawbacks discussed above by presenting a linear motor capable of long-path movement with six degrees of freedom (DoFs).

In order to achieve the above goal, the present invention provides a linear motor with six DoFs, including a magnet array and a coil group disposed above the magnet array, wherein the magnet array includes a first Halbach magnet array and a second Halbach magnet array, the first Halbach magnet array has a parallelogrammic cross section in a plane defined by an X-axis and a Y-axis, the first Halbach magnet array has a first side parallel to the Y-axis and a second side forming an angle of θ with the Y-axis, the second Halbach magnet array is in mirror symmetry with the first Halbach magnet array with respect to the Y-axis, and wherein the coil group includes a first coil group, a second coil group, a third coil group and a fourth coil group, each having an axis inclined at an angle of θ with respect to the Y-axis, the first coil group is in mirror symmetry with the third coil group with respect to the Y-axis, the second coil group is in mirror symmetry with the fourth coil group with respect to the Y-axis.

Further, the first Halbach magnet array may include a plurality of Halbach units each consisting of four permanent magnets that are put together sequentially along the Y-axis and each have a parallelogrammic cross section in the plane.

Further, the four permanent magnets may include an S-magnet, an H-magnet, an N-magnet and another H-magnet disposed sequentially in this order along the Y-axis, the S-magnet being magnetized along a Z-axis perpendicular to the plane, the N-magnet is magnetized oppositely to the S-magnet along the Z-axis, the H-magnets is magnetized toward the N-magnet in the plane.

Further, the number of the Halbach units may be 6.

Further, the first coil group may consist of three coils arranged horizontally along the Y-axis, each of the second, third and fourth coil groups has a same structure as the first coil group, and wherein the first coil group and the second coil group are arranged sequentially along the Y-axis.

Further, center lines of the first and second coil groups along the Y-axis may be aligned with a same horizontal line.

Alternatively, center lines of the first and second coil groups along the Y-axis may also be staggered from each other along the X-axis by an interval.

Further, θ may be greater than 0 degree and smaller than 90 degrees.

Further, the coil group may be accommodated in a housing.

By means of proper distribution and control of a plurality of vertical forces along the Z-axis and plurality of horizontal forces in the plane defined by the X- and Y-axes generated from cooperation of the first and second Halbach magnet arrays each cross-sectionally parallelogrammic along the plane with the four coil groups, the proposed linear motor is capable of moving with six DoFs. In addition, properly designing the number of Halbach units in each of the first and second Halbach magnet arrays allows a long movement path in the Y-axis for the linear motor.

BRIEF DESCRIPTION OF THE DRAWINGS

In FIGS. 1 and 2, 101 denotes Halbach magnet array, and 102a-102c, three-phase coils.

In FIGS. 3 to 6, 201 denotes magnet arrays; 201a, first Halbach magnet array; 2011a, Halbach units; 201b, second Halbach magnet array; 2012, S-magnet; 2013, N-magnet; 2014, H-magnets; 202, housing; 203, first coil group; 203a-203c, first coils; 204, second coil group; 204a-204c, second coils; 205, third coil group; 205a-205c, third coils; 206, fourth coil group; 206a-206c, fourth coils; θ, angle; and L, interval.

DETAILED DESCRIPTION

The present invention will be described below in detail with reference to the accompanying drawings.

Embodiment 1

Figure 1:
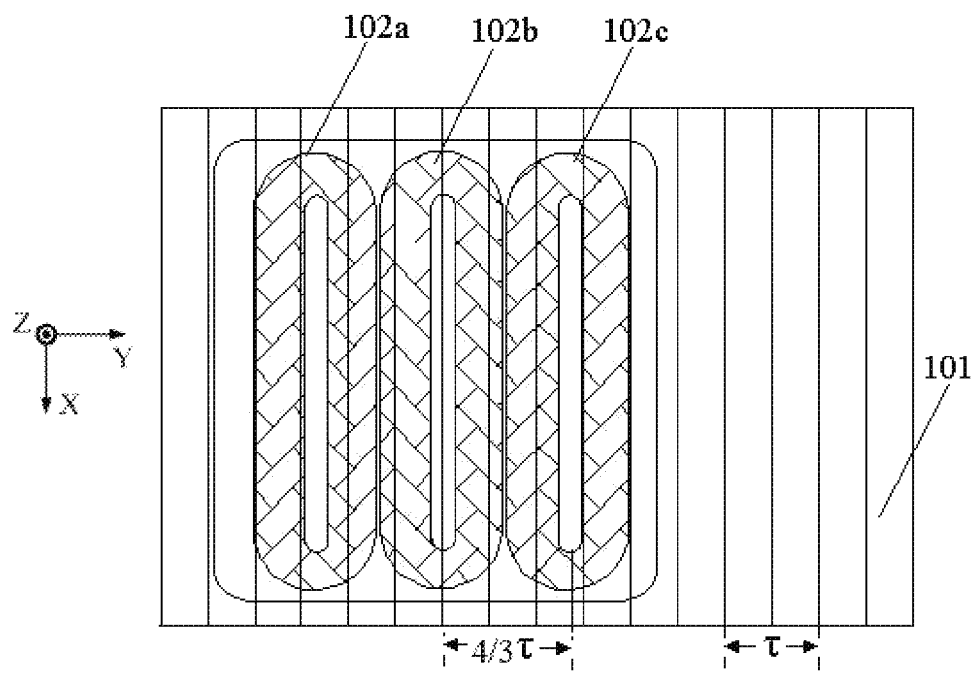
FIG. 1 is a structural schematic of a conventional linear motor.
Figure 2:
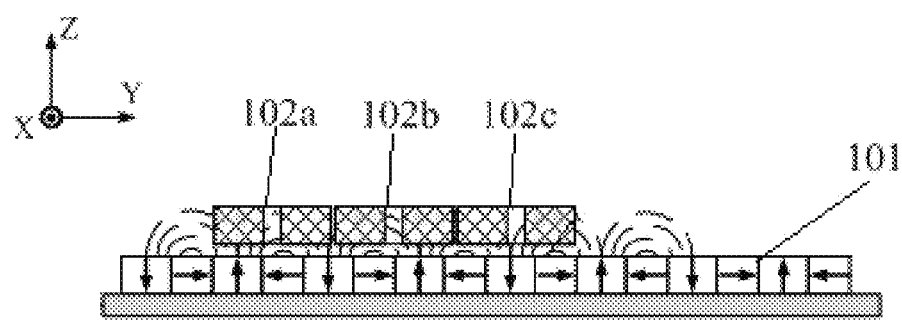
FIG. 2 is a cross-sectional view of the conventional linear motor.
Figure 3:
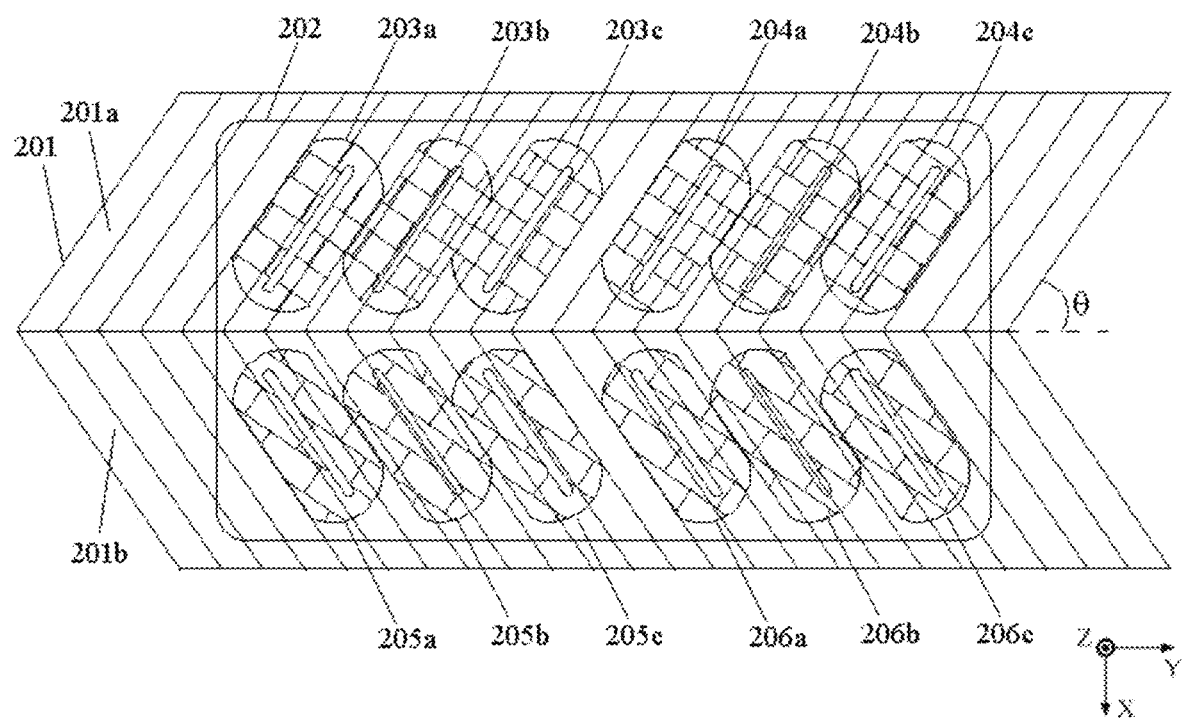
FIG. 3 is a structural schematic of a linear motor with six degrees of freedom (DoFs) according to a first embodiment of the present invention.

As shown in FIG. 3, the present invention provides a linear motor with six degrees of freedom (DoFs) which includes magnet arrays 201 and coil groups. The magnet arrays 201 include a first Halbach magnet array 201a and a second Halbach magnet array 201b. A cross section of the first Halbach magnet array 201a in the X-Y plane is a parallelogram. The first Halbach magnet array 201a has a pair of horizontal sides parallel to the Y-axis and a pair of inclined sides forming an angle θ with the Y-axis, where the angle θ is greater than 0° and smaller than 90°. The second Halbach magnet array 201b is structurally the same as the first Halbach magnet array 201a and is in mirror symmetry with the first Halbach magnet array 201a with respect to the Y-axis. The coil groups are disposed above the magnet arrays and so inclined that their center lines each form an angle θ with the Y-axis. That is, the inclined sides of the coil groups are each inclined at an angle θ relative to the Y-axis, where θ is greater than 0° and smaller than 90°. The coil groups include a first coil group 203, a second coil group 204, a third coil group 205 and a fourth coil group 206. The first coil group 203 is mirror-symmetrical to the third coil group 205 and the second coil group 204 to the fourth coil group 206, with respect to the Y-axis. The coil groups are accommodated within a housing 202. The first Halbach magnet array 201a and the second Halbach magnet array 201b, each having a parallelogrammic cross section in the X-Y plane, cooperate with the four coil groups to produce a plurality of vertical forces along the Z-axis and a plurality of horizontal forces in the X-Y plane. Distribution and control of the forces enable the linear motor to move with six DoFs.

Figure 4:
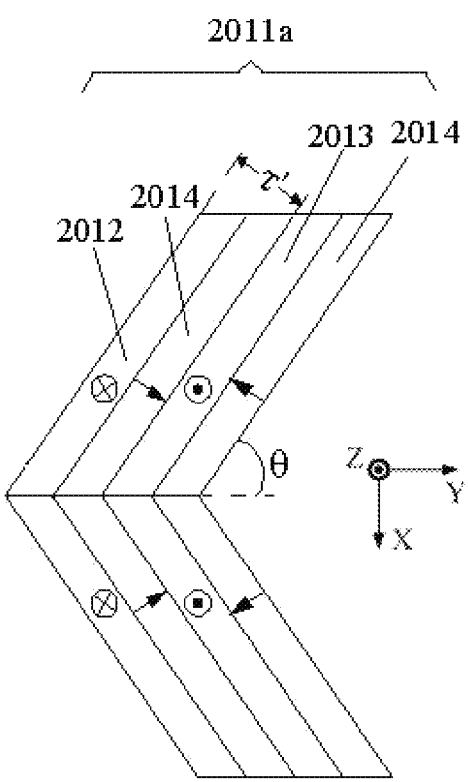
FIG. 4 is a structural schematic of a Halbach unit according to the first embodiment of the present invention.

Referring to FIGS. 3 and 4, the first Halbach magnet array 201a includes a number of Halbach units 2011a each consisting of four permanent magnets put together along the Y-axis. Each permanent magnet has a parallelogrammic cross-section in the X-Y plane. The number of the Halbach units 2011a is adjustable according to a practical length of movement along the Y-axis. In this embodiment, six Halbach units 2011a are provided. The second Halbach magnet array 201b is structurally the same as the first Halbach magnet array 201a and is in mirror symmetry with the first Halbach magnet array 201a with respect to the Y-axis. Long-path movement of the linear motor in the Y-axis is achievable by designing the number of Halbach units 2011a in the first Halbach magnet array 201a and the second Halbach magnet array 201b.

Figure 5:
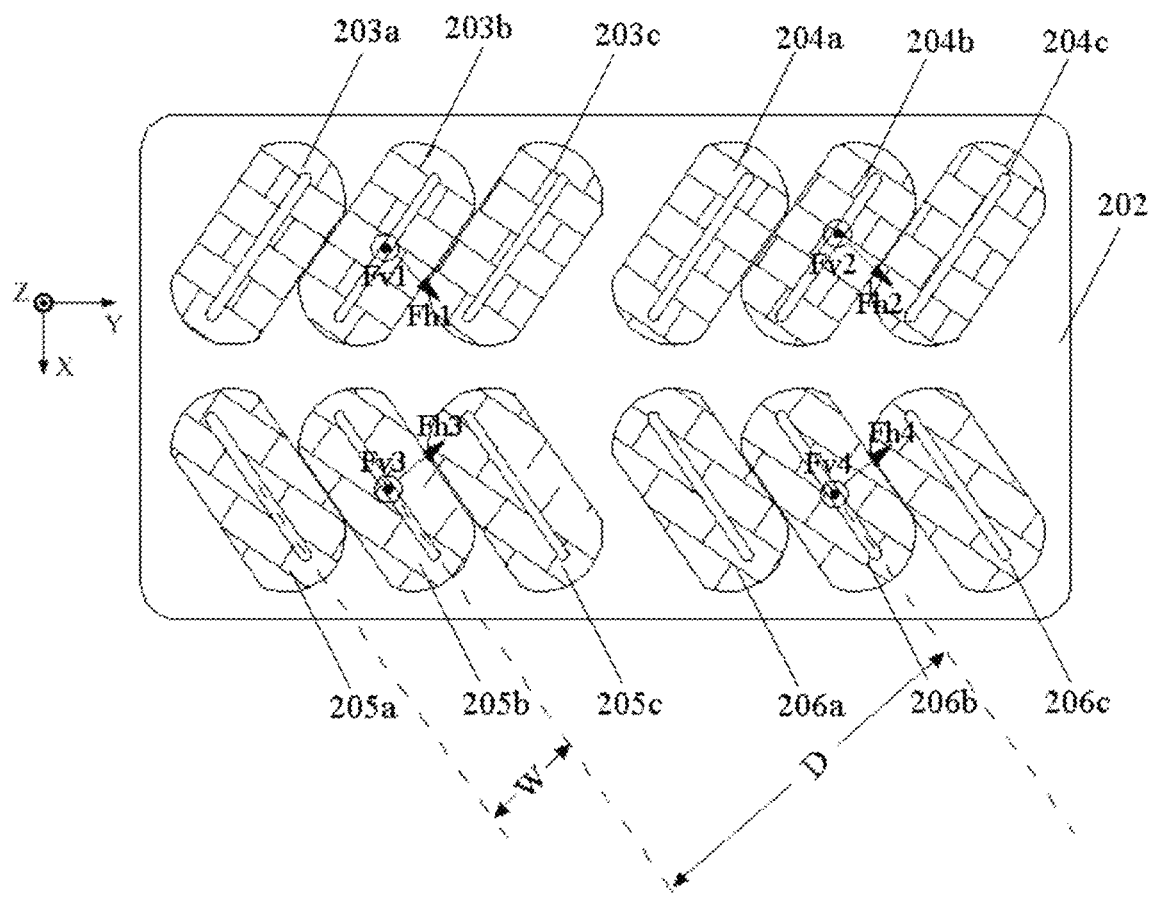
FIG. 5 schematically shows a distribution of coil groups according to the first embodiment of the present invention.

Referring with emphasis to FIG. 4, the four permanent magnets include an S-magnet 2012, an H-magnet 2014, an N-magnet 2013 and another H-magnet 2014, disposed sequentially in this order. The S-magnet 2012 is magnetized along the minus Z-axis, N-magnet 2013 along the plus Z-axis, and H-magnets 2014 always toward the N-magnet 2013 along the X-Y plane. Referring with emphasis to FIG. 5, the first coil group 203 consists of three first coils 203a, 203b, 203c arranged horizontal along the Y-axis. The second coil group 204 consists of three second coils 204a, 204b, 204c arranged horizontal along the Y-axis. The third coil group 205 consists of three third coils 205a, 205b, 205c arranged horizontal along the Y-axis. The fourth coil group 206 consists of three fourth coils 206a, 206b, 206c arranged horizontal along the Y-axis. The first coil 203a, 203b, 203c are inclined and their inclined sides are parallel to the inclined sides of the first Halbach magnet array 201a. Each of the second, third and fourth coil groups 204, 205, 206 is structured identically to the first coil group 203. The first coil group 203 and the second coil group 204 are arranged sequentially along the Y-axis and, the center lines of the first coil group 203 and the second coil group 204 along the Y-axis are aligned with the same horizontal line.

In the linear motor with six DoFs according to the present invention, the magnet arrays 201 work with the coil groups to produce actuating forces. The mechanism is that, for each coil group, assuming currents ia', ib', ic' are introduced into the respective three coils, a pole pitch of the permanent magnets is τ' the distance W between the centers of every two adjacent coils is 4τ'3 or 5τ'/3, with 4τ'/3 as an example, flux densities Bya', Byb', Byc' of a magnetic field created by the first coils 203a, 203b, 203c and the third coils 205a, 205b, 205c along the y'-axis and flux densities thereof Bza', Bzb', Bzc' along the Z-axis are given as:

$$\begin{cases} Bya' = \hat{B}y' \cdot \cos\left(\frac{\pi y'}{\tau'}\right) \\ Byb' = \hat{B}y' \cdot \cos\left(\frac{\pi y'}{\tau'} + \frac{4\pi}{3}\right) \\ Byc' = \hat{B}y' \cdot \cos\left(\frac{\pi y'}{\tau'} + \frac{8\pi}{3}\right) \end{cases} \quad (5)$$

$$\begin{cases} Bza' = -\hat{B}z' \cdot \sin\left(\frac{\pi y'}{\tau'}\right) \\ Bzb' = -\hat{B}z' \cdot \sin\left(\frac{\pi y'}{\tau'} + \frac{4\pi}{3}\right) \\ Bzc' = -\hat{B}z' \cdot \sin\left(\frac{\pi y'}{\tau'} + \frac{8\pi}{3}\right) \end{cases} \quad (6)$$

and flux densities Bya', Byb', Byc' of a magnetic field created by the second coils 204a, 204b, 204c and the fourth coils 206a, 206b, 206c along the y'-axis and flux densities thereof Bza', Bzb', Bzc' along the Z-axis are given as:

$$\begin{cases} Bya' = \hat{B}y' \cdot \cos\left(\frac{\pi(y'+D)}{\tau'}\right) \\ Byb' = \hat{B}y' \cdot \cos\left(\frac{\pi(y'+D)}{\tau'} + \frac{4\pi}{3}\right) \\ Byc' = \hat{B}y' \cdot \cos\left(\frac{\pi(y'+D)}{\tau'} + \frac{8\pi}{3}\right) \end{cases} \quad (7)$$

$$\begin{cases} Bza' = -\hat{B}z' \cdot \sin\left(\frac{\pi(y'+D)}{\tau'}\right) \\ Bzb' = -\hat{B}z' \cdot \sin\left(\frac{\pi(y'+D)}{\tau'} + \frac{4\pi}{3}\right) \\ Bzc' = -\hat{B}z' \cdot \sin\left(\frac{\pi(y'+D)}{\tau'} + \frac{8\pi}{3}\right) \end{cases} \quad (8)$$

where $\hat{B}y'$ represents flux density amplitude of the magnet arrays 201 along the y'-axis, $\hat{B}z'$ denotes flux density amplitude of the magnet arrays 201 along the Z-axis, y'=(Y-displacement of the linear motor)*sin θ, * is the mathematical multiplication symbol, and D is the distance between the centers of the first coil group 203 and the second coil group 204 along the y'-axis.

According to a vector control technique for three-phase motors, control is accomplished by D-Q decomposition, wherein vertical and horizontal (i.e., in the X-Y plane) forces are controlled by d- and q-axis currents, with the currents ia', ib', ic' for the first coils 203a, 203b, 203c and the third coils 205a, 205b, 205c expressed as a function of the d- and q-axis currents id and iq:

$$\begin{cases} ia' = iq \cdot \cos\left(\frac{\pi y'}{\tau'}\right) - id \cdot \sin\left(\frac{\pi y'}{\tau'}\right) \\ ib' = iq \cdot \cos\left(\frac{\pi y'}{\tau'} + \frac{4\pi}{3}\right) - id \cdot \sin\left(\frac{\pi y'}{\tau'} + \frac{4\pi}{3}\right), \\ ic' = iq \cdot \cos\left(\frac{\pi y'}{\tau'} + \frac{8\pi}{3}\right) - id \cdot \sin\left(\frac{\pi y'}{\tau'} + \frac{8\pi}{3}\right) \end{cases} \quad (9)$$

and the currents ia', ib', for the second coils 204a, 204b, 204c and the fourth coils 206a, 206b, 206c expressed as a function of the d- and q-axis currents id and iq:

$$\begin{cases} ia' = iq \cdot \cos\left(\frac{\pi(y'+D)}{\tau'}\right) - id \cdot \sin\left(\frac{\pi(y'+D)}{\tau'}\right) \\ ib' = iq \cdot \cos\left(\frac{\pi(y'+D)}{\tau'} + \frac{4\pi}{3}\right) - id \cdot \sin\left(\frac{\pi(y'+D)}{\tau'} + \frac{4\pi}{3}\right). \\ ic' = iq \cdot \cos\left(\frac{\pi(y'+D)}{\tau'} + \frac{8\pi}{3}\right) - id \cdot \sin\left(\frac{\pi(y'+D)}{\tau'} + \frac{8\pi}{3}\right) \end{cases} \quad (10)$$

From these formulas, the horizontal and vertical forces Fh, Fz generated by the linear motor can be calculated as:

$$\begin{bmatrix} Fh \\ Fv \end{bmatrix} = \begin{bmatrix} Bya' & Byb' & Byc' \\ Bza' & Bzb' & Bzc' \end{bmatrix} \times \begin{bmatrix} ia' \\ ib' \\ ic' \end{bmatrix} \quad (11)$$

The horizontal force Fh and the vertical force Fv can be converted into forces Fx, Fy, Fz along the X-, Y- and Z-axis according to:

$$\begin{bmatrix} Fx \\ Fy \\ Fz \end{bmatrix} = \begin{bmatrix} \sin\theta & 0 \\ \cos\theta & 0 \\ 0 & 1 \end{bmatrix} \times \begin{bmatrix} Fh \\ Fv \end{bmatrix} \quad (12)$$

As shown in FIG. 5, the first coil group 203 generates a vertical force Fv1 along the Z-axis and a horizontal force Fh1 in the X-Y plane, the second coil group 204 generates a vertical force Fv2 along the Z-axis and a horizontal force Fh2 in the X-Y plane, the third coil group 205 generates a vertical force Fv3 along the Z-axis and a horizontal force Fh3 in the X-Y plane, and the fourth coil group 206 generates a vertical force Fv4 along the Z-axis and a horizontal force Fh4 in the X-Y plane. Y-directional components of the horizontal forces Fh1, Fh2 are exerted along a same horizontal line, and Y-directional components of the horizontal forces Fh3, Fh3 along another same horizontal line. According to the force distribution and control principles, the horizontal forces Fh1, Fh2, Fh3, Fh4 in the X-Y plane allow translation along the X- and Y-axis and slight rotation about the Z-axis of the linear motor. Additionally, the vertical forces Fv1, Fv2, Fv3, Fv4 allow slight translation along the Z-axis and slight rotation about the X- and Y-axis of the linear motor. That is, the linear motor is capable of movement with six DoFs with high positioning accuracy.

Embodiment 2

Figure 6:
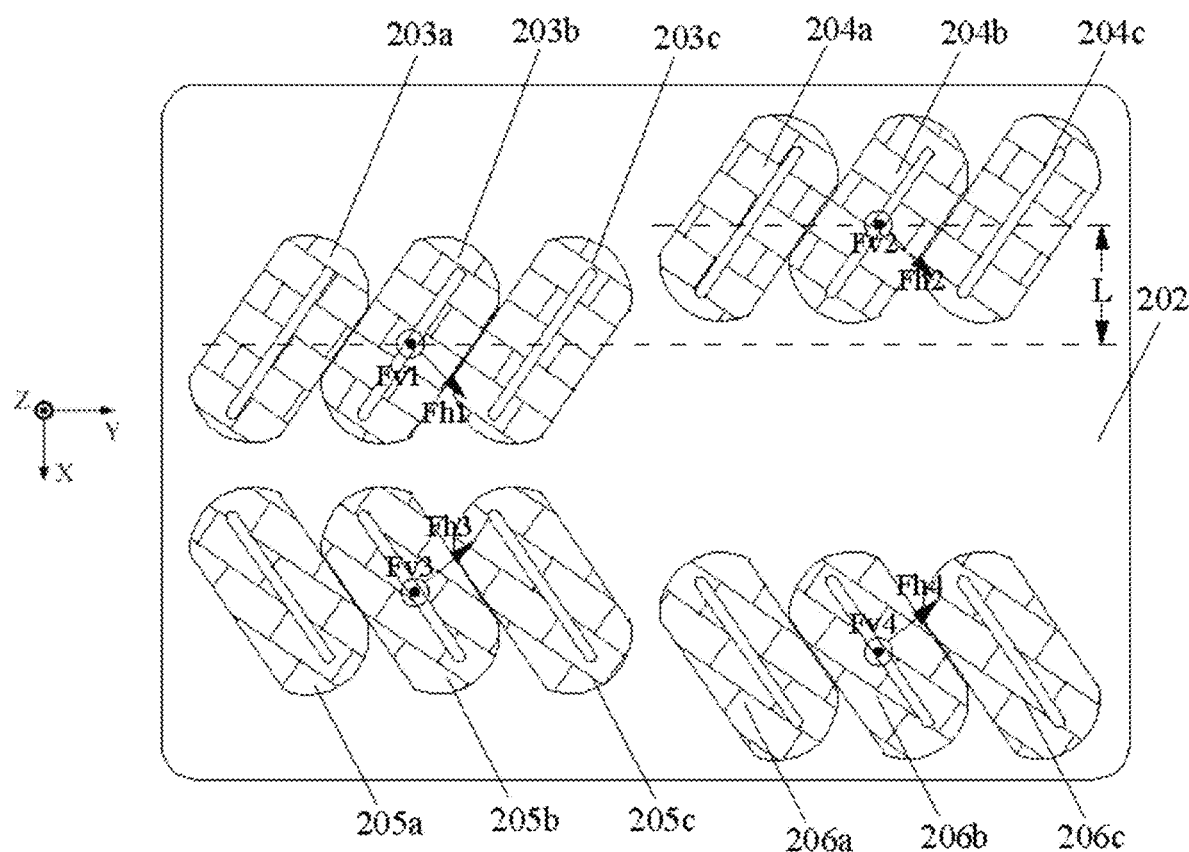
FIG. 6 schematically shows a distribution of coil groups according to a second embodiment of the present invention.

Differing from Embodiment 1, the center line along the Y-axis of the second coil group 204 is staggered from that of the first coil group 203 along the X-axis by an interval L, in accordance with this embodiment. Since the third coil group 205 is in mirror symmetry with the first coil group 203 and the fourth coil group 206 is in mirror symmetry with the second coil group 204 with respect to the Y-axis, there is also an interval L along the X-axis between the center lines of the fourth coil group 206 and the third coil group 205, as shown in FIG. 6. The first coil group 203 produces a vertical force Fv1 along the Z-axis and a horizontal force Fh1 in the X-Y plane, the second coil group 204 produces a vertical force Fv2 along the Z-axis and a horizontal force Fh2 in the X-Y plane, the third coil group 205 produces a vertical force Fv3 along the Z-axis and a horizontal force Fh3 in the X-Y plane, and the fourth coil group 206 produces a vertical force Fv4 along the Z-axis and a horizontal force Fh4 in the X-Y plane. The components of the horizontal forces Fh1, Fh2 along the Y-axis are staggered from each other along the X-axis by an interval L, and the components of the horizontal forces Fh3, Fh3 along the Y-axis are also staggered from each other along the X-axis by an interval L. According to the force distribution and control principles, the horizontal forces Fh1, Fh2, Fh3, Fh4 within the X-Y plane allow translation along the X- and Y-axis and slight rotation about the Z-direction of the linear motor. Additionally, the vertical forces Fv1, Fv2, Fv3, Fv4 allow slight translation along the Z-axis and slight rotation about the X- and Y-axis of linear motor. That is, the linear motor is capable of movement with six DoFs.

The above arrangement of the coil groups allows for Y-directional redundant actuation of the linear motor with six DoFs according to this embodiment. As used herein, the term "redundant actuation" refers to using additional actuators to those necessary for the six DoFs to reduce vibration during movement, improve the control bandwidth or allow less mass of the linear motor at the same bandwidth so as to enhance the performance thereof.

Although several embodiments of the present invention have been described above herein, they are intended to be merely illustrative but not to limit the scope of the invention. All omissions, substitutions and alterations made without departing from the spirit of the present invention are all embraced within the scope thereof.

The invention claimed is:

1. A linear motor with six degrees of freedom, comprising a magnet array and a coil group disposed above the magnet array, wherein the magnet array includes a first Halbach magnet array and a second Halbach magnet array, the first Halbach magnet array having a parallelogrammic cross section in a plane defined by an X-axis and a Y-axis, the first Halbach magnet array having a first side parallel to the Y-axis and a second side forming an angle of θ with the Y-axis, the second Halbach magnet array being in mirror symmetry with the first Halbach magnet array with respect to the Y-axis, and wherein the coil group includes a first coil group and a second coil group disposed above the first Halbach magnet array, and a third coil group and a fourth coil group disposed above the second Halbach magnet array, the first and second coil groups each having an axis inclined at the angle of θ with respect to the Y-axis, the first coil group being in mirror symmetry with the third coil group with respect to the Y-axis, the second coil group being in mirror symmetry with the fourth coil group with respect to the Y-axis, wherein the first Halbach magnet array comprises a plurality of Halbach units each consisting of four permanent magnets that are put together sequentially along the Y-axis and each having a third side parallel to the Y-axis and a fourth side forming the angle of θ with respect to the Y-axis.

2. The linear motor with six degrees of freedom according to claim 1, wherein the four permanent magnets include an S-magnet, an H-magnet, an N-magnet and another H-magnet disposed sequentially in this order along the Y-axis, the S-magnet being magnetized along a Z-axis perpendicular to the plane, the N-magnet being magnetized oppositely to the S-magnet along the Z-axis, the H-magnets being magnetized toward the N-magnet in the plane.

3. The linear motor with six degrees of freedom according to claim 2, wherein a number of the Halbach units is 6.

4. The linear motor with six degrees of freedom according to claim 1, wherein the first coil group consists of three coils arranged horizontally along the Y-axis, each of the second, third and fourth coil groups having a same structure as the first coil group, and wherein the first coil group and the second coil group are arranged sequentially along the Y-axis.

5. The linear motor with six degrees of freedom according to claim 4, wherein center lines of the first and second coil groups along the Y-axis are aligned with a same horizontal line.

6. The linear motor with six degrees of freedom according to claim 4, wherein center lines of the first and second coil groups along the Y-axis are staggered from each other along the X-axis by an interval.

7. The linear motor with six degrees of freedom according to claim 1, wherein θ is greater than 0 degree and smaller than 90 degrees.

8. The linear motor with six degrees of freedom according to claim 1, wherein the coil group is accommodated in a housing.

* * * * *